United States Patent
Yao et al.

(10) Patent No.: US 6,927,945 B2
(45) Date of Patent: Aug. 9, 2005

(54) COLLOCATED METAL FRAME PZT MICRO-ACTUATOR WITH A LOWER STIFFNESS SUSPENSION DESIGN

(75) Inventors: Ming-Gao Yao, Dongguan (CN); Masashi Shiraishi, Kowloon (HK); Yi-Ru Xie, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 163 days.

(21) Appl. No.: 10/278,347

(22) Filed: Oct. 22, 2002

(65) Prior Publication Data

US 2004/0001288 A1 Jan. 1, 2004

(30) Foreign Application Priority Data

Jun. 26, 2002 (CN) .............................. PCT/CN02/00439

(51) Int. Cl.[7] .............................. G11B 21/24; G11B 5/56
(52) U.S. Cl. .................................................. 360/294.3
(58) Field of Search .................... 360/294.3, 294.4, 360/294.1, 294, 290, 240, 245, 264.2

(56) References Cited

U.S. PATENT DOCUMENTS

| | | | |
|---|---|---|---|
| 5,864,445 A | 1/1999 | Bennin et al. ........... | 360/245.9 |
| 5,956,212 A | 9/1999 | Zhu ........................ | 360/245.4 |
| 6,198,606 B1 | 3/2001 | Boutaghou et al. ...... | 360/294.3 |
| 6,215,629 B1 * | 4/2001 | Kant et al. .................. | 360/290 |
| 6,320,730 B1 * | 11/2001 | Stefansky et al. ....... | 360/294.4 |
| 6,376,964 B1 | 4/2002 | Young et al. ............... | 310/311 |

FOREIGN PATENT DOCUMENTS

EP  0 557 710 A2  1/1993

OTHER PUBLICATIONS

PCT International Search Report (PCT Article 18 and Rule 43 and 44); Applicant's or agent's file reference: FPEL02150021.

* cited by examiner

Primary Examiner—Julie Anne Watko
(74) Attorney, Agent, or Firm—Kenyon & Kenyon

(57) ABSTRACT

A framing assembly with lower stiffness design and a method of manufacturing that framing assembly are disclosed. In one embodiment, a framing assembly pattern is cut from a piece of a thin planar material, such as metal. The pattern is then bent to form a framing assembly with a base piece, two arms, and supports for a connection plate. In an alternate embodiment, the base piece includes a rear support and a support base. In a further embodiment, excess material surrounding the pattern is cut away so as to allow the most efficient use of the material.

17 Claims, 16 Drawing Sheets

COLLOCATED METAL FRAME PZT MICRO-ACTUATOR WITH A LOWER STIFFNESS SUSPENSION DESIGN

BACKGROUND INFORMATION

The present invention relates to magnetic hard disk drives. More specifically, the present invention relates to a method of manufacturing framing assemblies for the micro-actuators.

In the art today, different methods are utilized to improve recording density of hard disk drives. FIG. 1 provides an illustration of a typical disk drive with a typical drive arm 102 configured to read from and write to a magnetic hard disk 104. Typically, voice-coil motors (VCM) 106 are used for controlling a hard drive's arm 102 motion across a magnetic hard disk 106. Because of the inherent tolerance (dynamic play) that exists in the placement of a recording head 108 by a VCM 106 alone, micro-actuators 110 are now being utilized to 'fine-tune' head 108 placement. A VCM 106 is utilized for course adjustment and the micro-actuator 110 then corrects the placement on a much smaller scale to compensate for the VCM's 106 (with the arm 102) tolerance. This enables a smaller recordable track width, increasing the 'tracks per inch' (TPI) value of the hard drive (increased drive density).

FIG. 2 provides an illustration of a micro-actuator as used in the art. Typically, a slider 202 (containing a read/write magnetic head; not shown) is utilized for maintaining a prescribed flying height above the disk surface 104 (See FIG. 1). Micro-actuators may have flexible beams 204 connecting a support device 206 to a slider containment unit 208 enabling slider 202 motion independent of the drive arm 102 (See FIG. 1). An electromagnetic assembly or an electromagnetic/ferromagnetic assembly (not shown) may be utilized to provide minute adjustments in orientation/location of the slider/head 202 with respect to the arm 102 (See FIG. 1).

Prior designs tend to have dynamic performance problems. These problems are due to flex cable changes caused by the environment, handling, or manufacture. Additionally, current micro-actuator frames, often made of substances such as lead zirconate titanate (PZT) or zirconia, tend to be heavier, affecting the ability of the magnetic read/write head of the head gimbal assembly to fly across the disk. Certain micro-actuators also have a problem with particle generation, which can damage parts within the disk driver. A micro-actuator that is lighter in weight and less stiff could greatly improve the dynamic performance of the disk drive.

DETAILED DESCRIPTION

A framing assembly with a lower stiffness design and a method of manufacturing that framing assembly are disclosed. In one embodiment, a framing assembly pattern is cut from a piece of a thin planar material, such as metal like stainless steel. The pattern is then bent to form a framing assembly with a base piece, two arms, and supports for a connection plate. In an alternate embodiment, the base piece includes a rear support and a support base. In a further embodiment, excess material surrounding the pattern is cut away so as to allow the most efficient use of the material. The collocated PZT metal frame micro-actuators produced by this method tend to have a high shock performance of more than 1400 G vertical tilt drop shock, a high displacement of 2.5 μm peak to peak by 20+/−20 V exciting voltage, and a high resonance frequency of more than 25 kHz.

Figure 1:
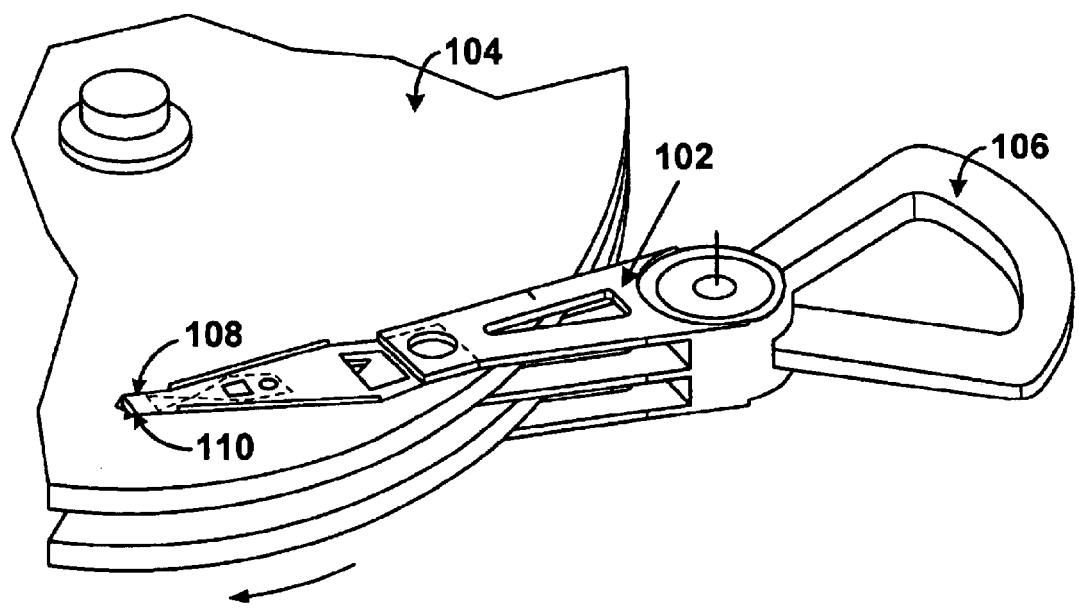
FIG. 1 provides an illustration of an internal view of a hard disk drive including a drive arm configured to read from and write to a magnetic hard disk as used in the art.
Figure 2:
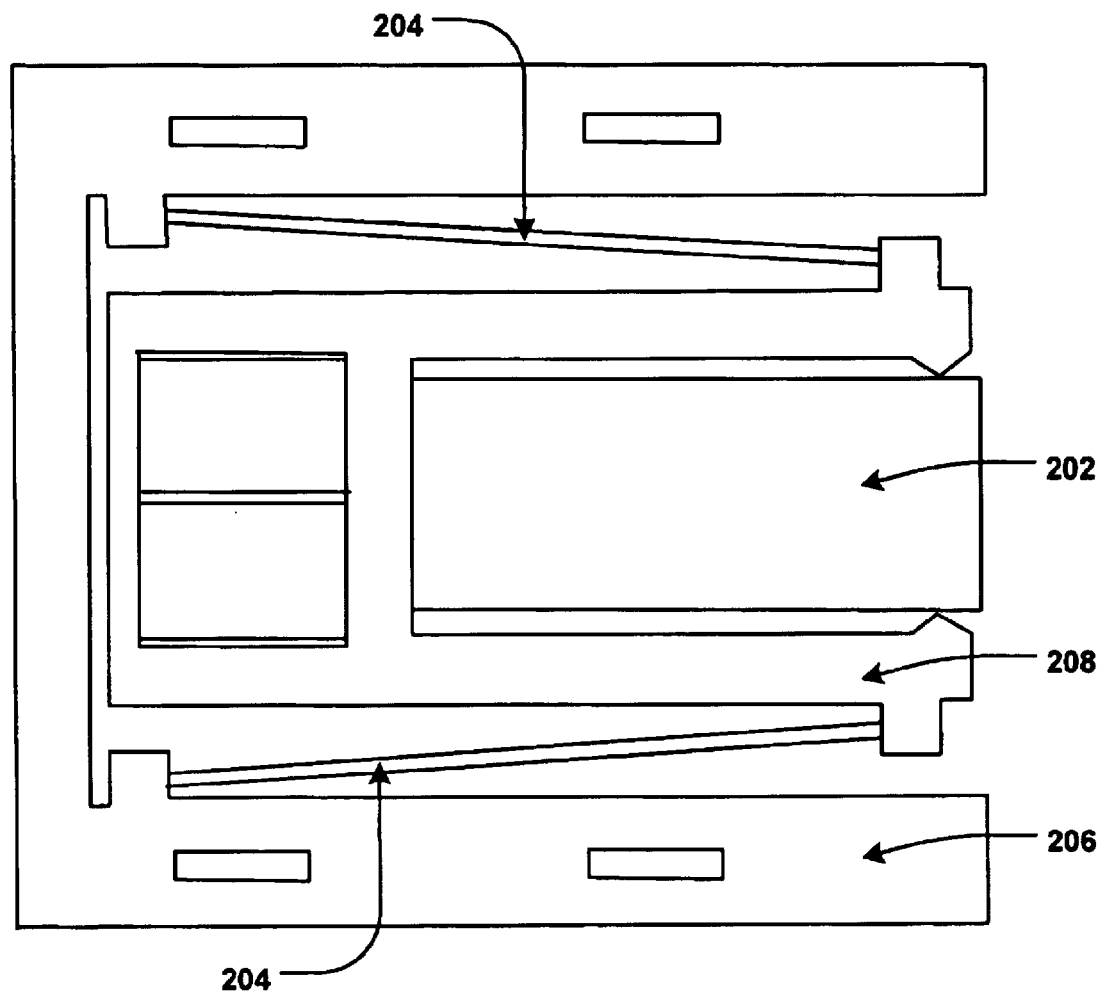
FIG. 2 provides an illustration of a micro-actuator as used in the art.
Figure 3A:
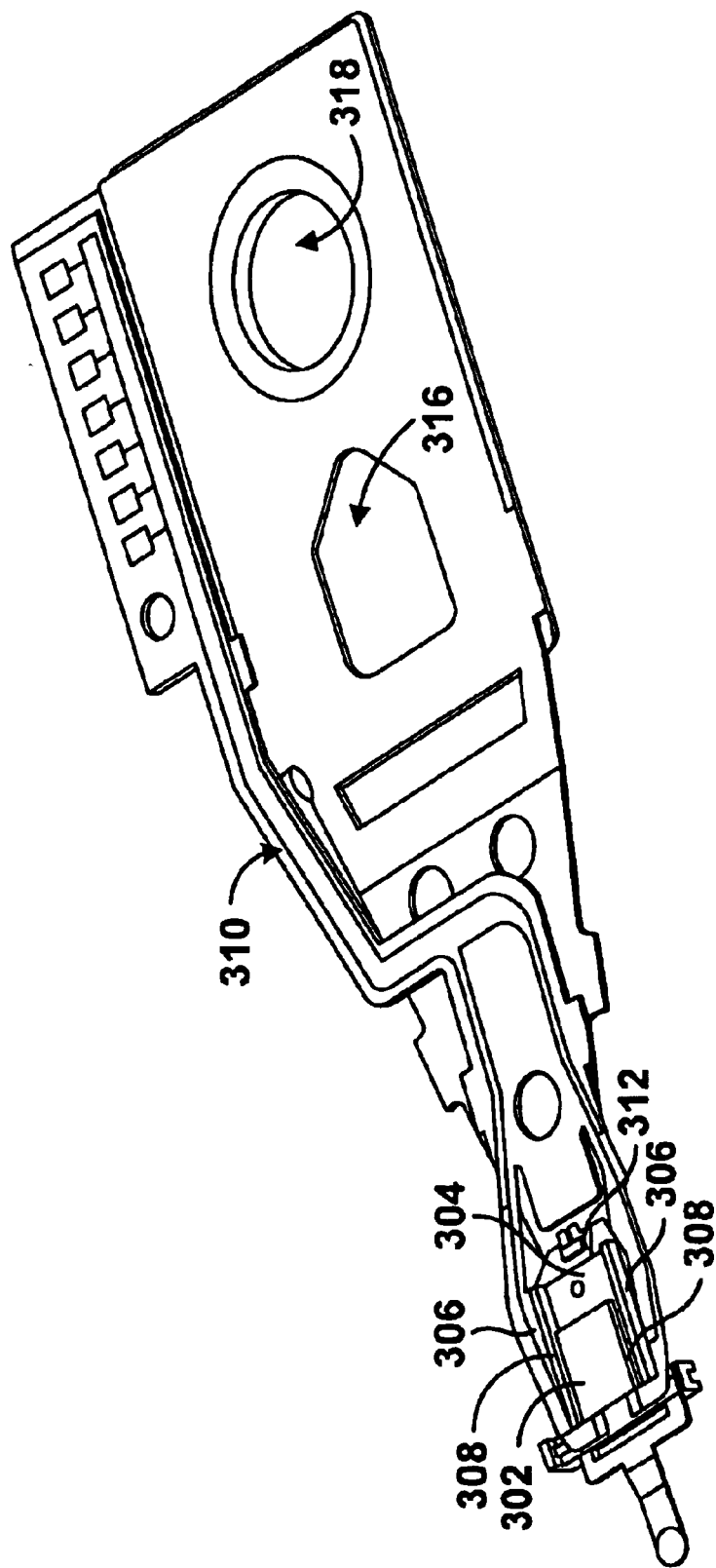
FIGS. 3a–b describes a hard disk drive head gimbal assembly (HGA) with a 'U'-shaped micro-actuator under principles of the present invention.
Figure 3B:
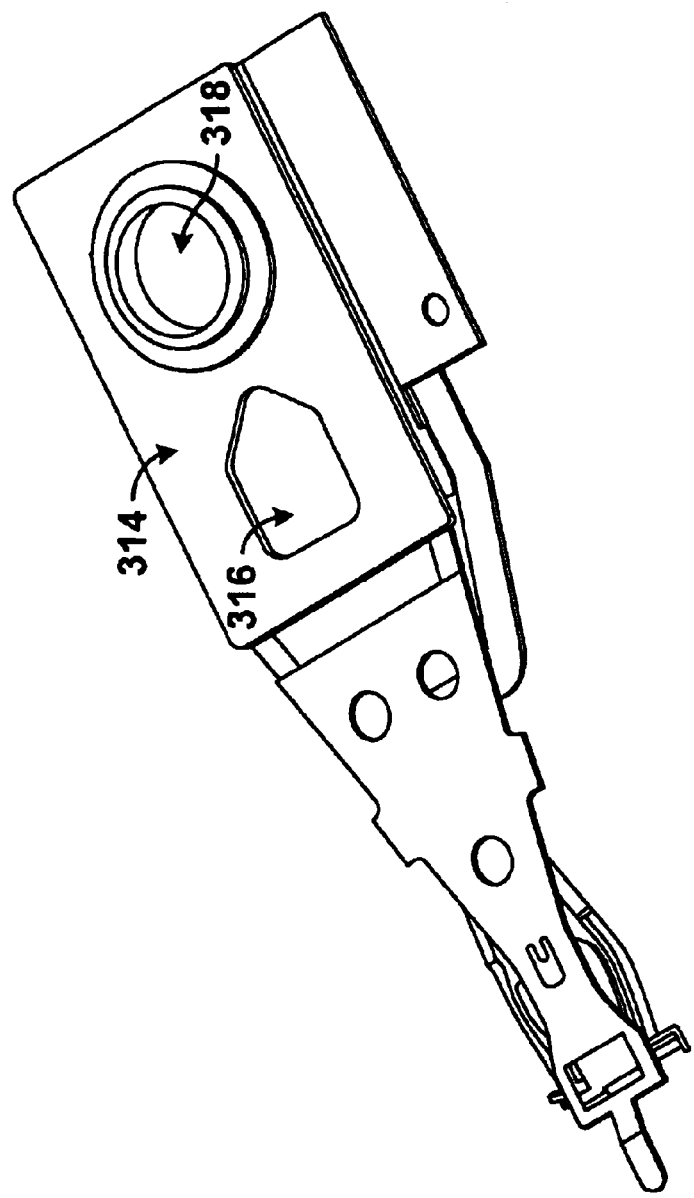

Illustrated in an upside-down orientation, FIG. 3a describes one embodiment of a hard disk drive head gimbal assembly (HGA) with a 'U'-shaped micro-actuator. In one embodiment, a magnetic read/write head, or slider, 302 is coupled to a framing assembly 304 forming a 'U'-shaped micro-actuator. In a further embodiment, the 'U'-shaped micro-actuator has a piezoelectric Lead Zirconate Titanate (PZT) beam (arm) 306 attached to an arm 308 on each side of the framing assembly 304. In one embodiment, a printed circuit assembly 310 is electrically coupled to the slider 302 to control reading and writing functions. The micro-actuator 306 is coupled to a suspension assembly 312, the suspension assembly being part of the head gimbal assembly (HGA) 314. A first hole 316 is cut into the HGA 314 to reduce weight. A second hole 318 allows the HGA 314 to be mounted on a pivot. FIG. 3b illustrates the present embodiment in a reverse orientation.

Figure 4A:
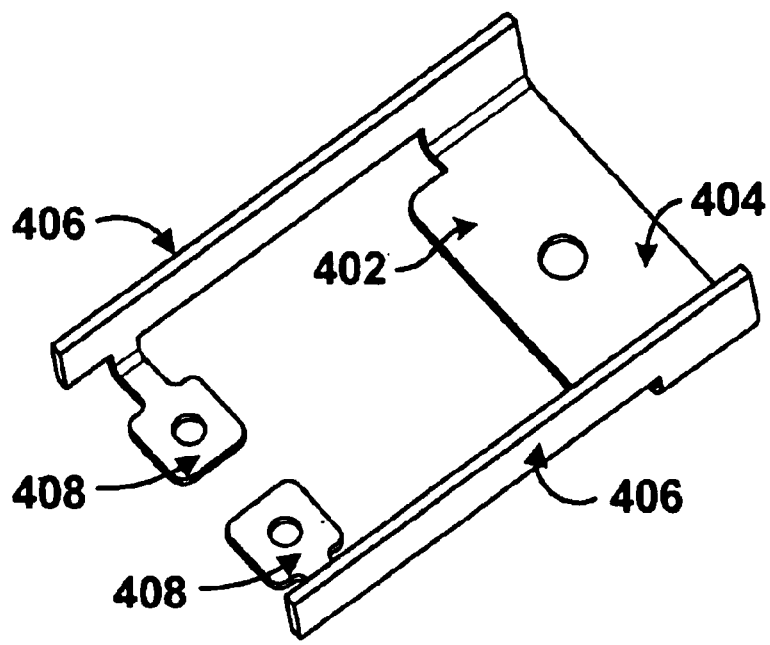
FIGS. 4a–b provides an illustration of one embodiment of a framing assembly.
Figure 4B:
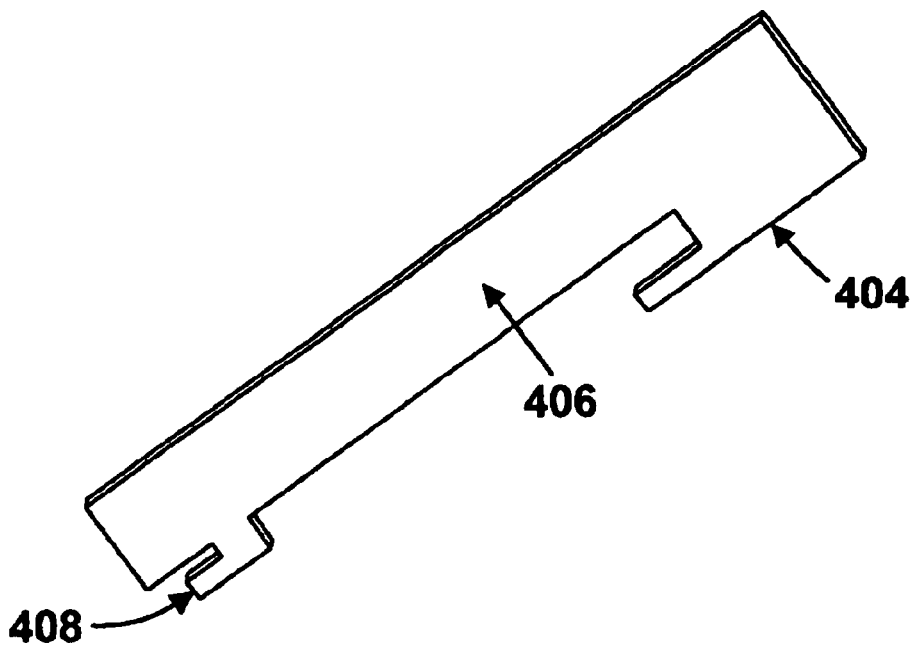

FIGS. 4a–b illustrate one embodiment of a framing assembly 402 used to create the micro-actuator and to attach the micro-actuator to the slider 302 and the HGA 314. FIG. 4a shows a top view of one embodiment of the framing assembly. In one embodiment, the framing assembly 402 has a base piece 404 with two arms 406 extending from the base piece 404. In a further embodiment, each arm 406 has a support 408 extending from the arm. In one embodiment, the supports 408 are between the two arms 406. FIG. 4b shows a side view of one embodiment of the framing assembly. In one embodiment, the supports 408 are on a different parallel plane from the base piece 404 in order to help maintain a parallel gap between the slider 302 and the suspension tongue 312. In one embodiment, the framing assembly 402 is a metal, such as stainless steel.

Figure 5A:
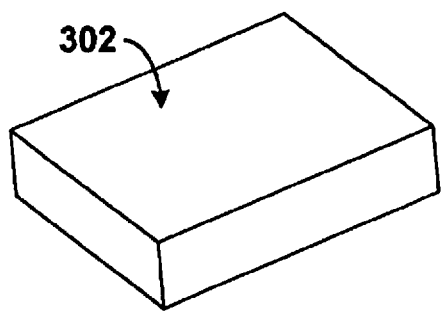
FIGS. 5a–c provides an illustration of one embodiment of the magnetic read/write head, strips of piezoelectric material, and HGA used in the present invention.
Figure 5B:
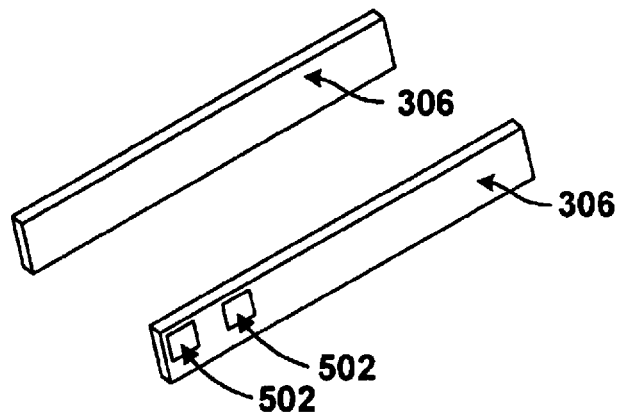
Figure 5C:
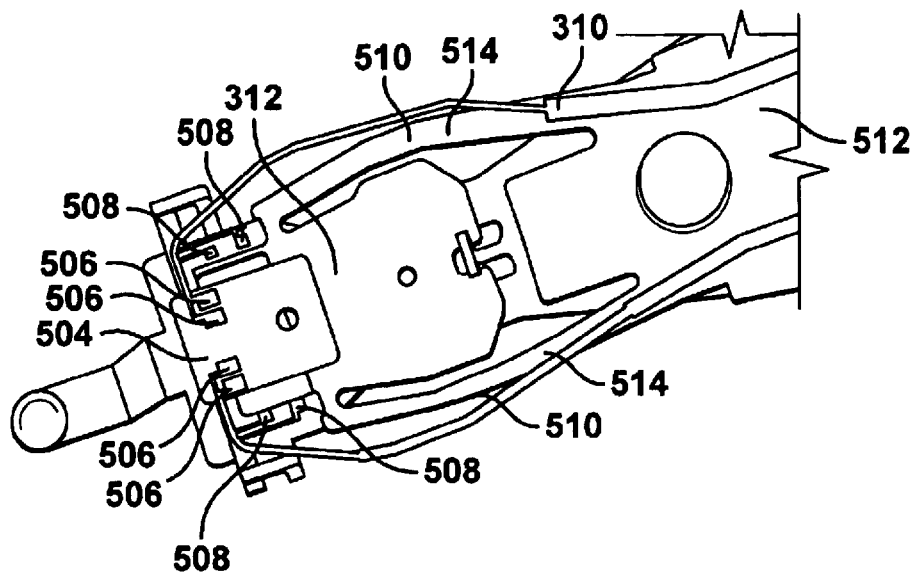

FIGS. 5a–c illustrate one embodiment of the pieces which, when coupled to the framing assembly 402, will form the HGA 314 and micro-actuator with magnetic read/write head 302. FIG. 5a shows one embodiment of the magnetic read/write head 302. FIG. 5b shows two strips of PZT material 306. In one embodiment, two electric contact pads 502 are on the exterior of each strip of PZT material 306. FIG. 5c shows one embodiment of an HGA 314. The HGA has a suspension assembly, or suspension tongue, 312 to be coupled to the framing assembly. In a further embodiment, the HGA 314 has a connection plate 504, which allows the printed circuit assembly 310 to be electrically coupled to the magnetic read/write head 302. In one embodiment, slider electrical pads 506 and micro-actuator electrical pads 508 are affixed to the connection plate 504. In one embodiment, two outriggers 510 are coupled to the load beam 512 and to the suspension tongue 312. Each outrigger has a bend 514 to maintain the parallel space between the suspension tongue 312 and the loadbeam 512.

Figure 6A:
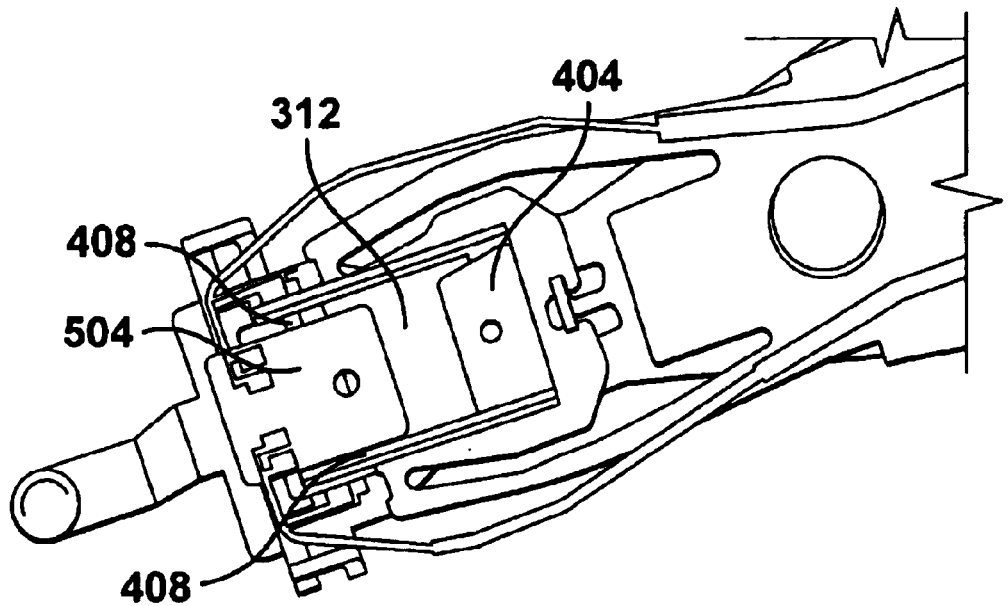
FIGS. 6a–b provides an illustration of a method of coupling the framing assembly to the head gimbal assembly.
Figure 6B:
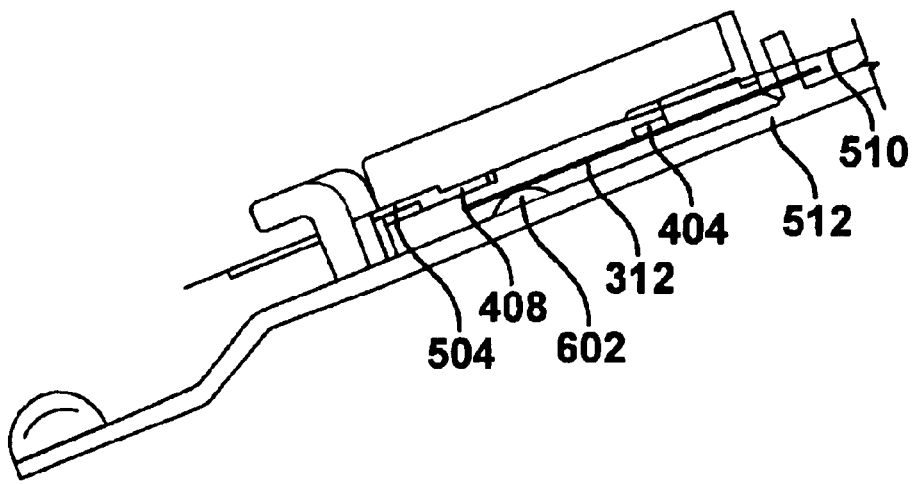

FIG. 6a illustrates a top view of one embodiment of the framing assembly 402 coupled to the HGA 314. The base piece 404 is coupled to the suspension tongue 312 of the HGA 314. In one embodiment, the base piece 404 is coupled to the suspension tongue 312 by laser welding. In an alternate embodiment, the base piece 404 is coupled to the suspension tongue 312 using an ultra-violet cured epoxy. The connection plate 504 is coupled to the supports 408. In one embodiment, the connection plate 504 is coupled to the supports 408 by laser welding. In an alternate embodiment, the connection plate 504 is coupled to supports 408 using an ultra-violet cured epoxy. FIG. 6b illustrates a side view of one embodiment of the framing assembly 402 coupled to the HGA 314. The supports 408 are positioned between the connection plate 504 and the suspension tongue 312. The base piece 404 is coupled to the suspension tongue 312 on the side exterior to the HGA 314. In one embodiment, the differing parallel planes of the base piece 404 and the supports 408 helps to maintain a parallel gap between the connection plate 504 or the micro-actuator frame supports 408 and the suspension tongue 312. In one embodiment, a dimple 602 helps the outriggers 510 maintain a parallel gap between the suspension tongue 312 and the loadbeam 512.

Figure 7A:
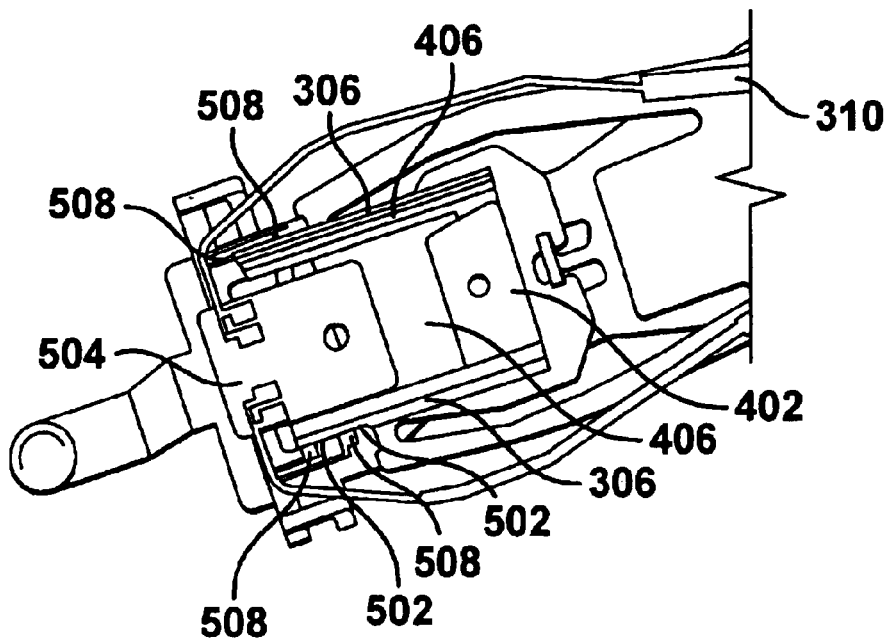
FIGS. 7a–b provides an illustration of a method of coupling the magnetic read/write head and piezo electric material strips to the framing assembly.

FIG. 7a illustrates a top view of one embodiment of two strips of PZT material 306 coupled to the framing assembly 402. In one embodiment, each of the strips of PZT material 306 is coupled to an arm 406 of the framing assembly 402. In a further embodiment, each of the contact pads 502 on the exterior of the two strips of PZT material 306 are electrically coupled to the micro-actuator electrical pads 508 affixed to the connection plate 504.

Figure 7B:
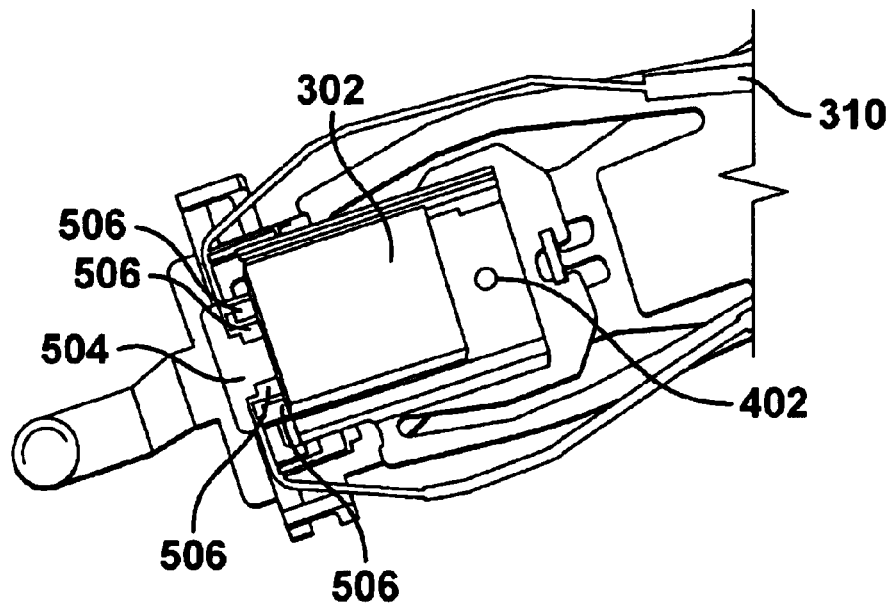

FIG. 7b illustrates a top view of one embodiment of the magnetic read/write head 302 coupled to the HGA 314. In one embodiment, the magnetic read/write head is coupled to the connection plate 504. In a further embodiment, the magnetic read/write head is also electrically coupled to the slider electrical pads 504 affixed to the connection plate 504.

Figure 8A:
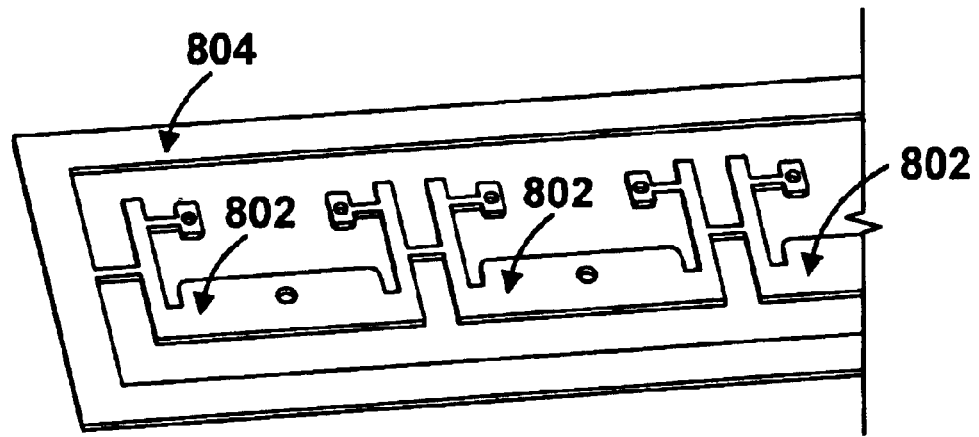
FIGS. 8a–d provides an illustration of a first method for manufacturing the framing assembly.
Figure 8B:
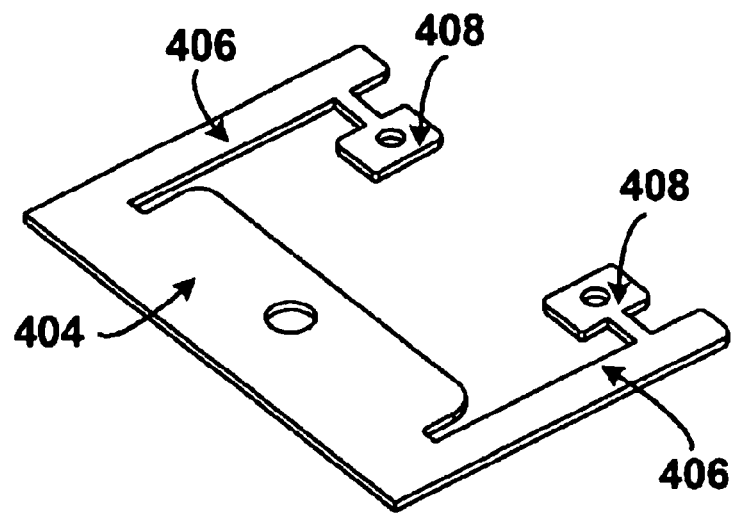
Figure 8C:
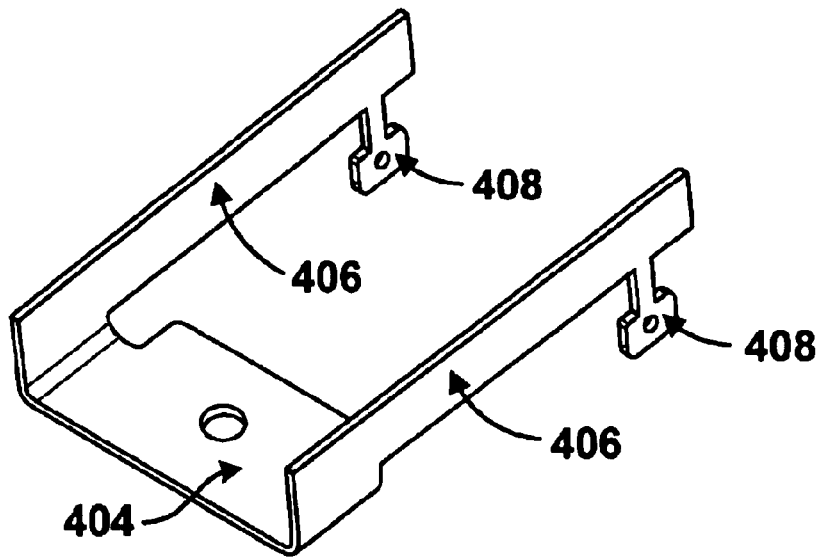
Figure 8D:
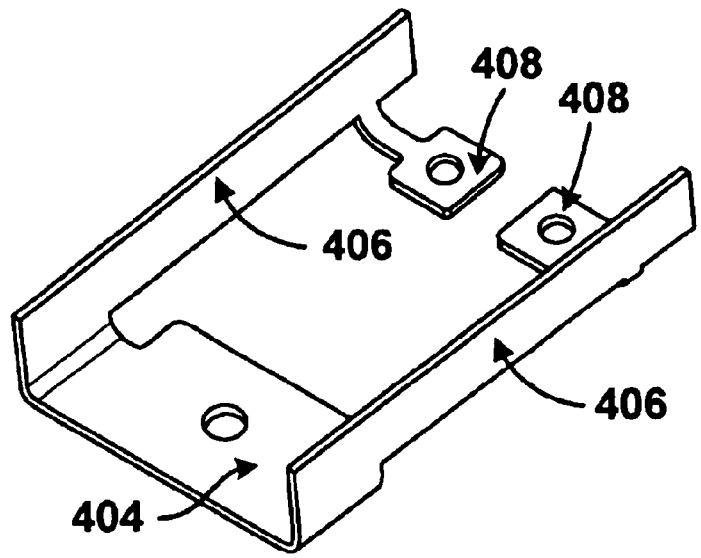

FIGS. 8a–d illustrate one embodiment of a method for manufacturing the framing assembly 402. FIG. 8a shows a series of framing assembly patterns 802 being cut from a single, thin planar piece of material 804. In FIG. 8b, a framing assembly pattern 802 is separated from the other patterns and the excess material 804. In one embodiment, a base piece 404, two arms 406, and supports 408 are all present in the pattern. In FIG. 8c, the arms 406 are bent perpendicular to the base piece 404. In FIG. 8d, the supports 408 are bent perpendicular to the arms 406.

Figure 9A:
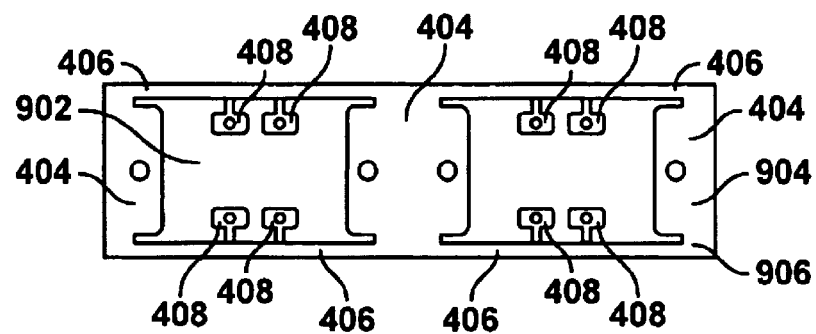
FIGS. 9a–d provides an illustration of a second method for manufacturing the framing assembly.
Figure 9B:
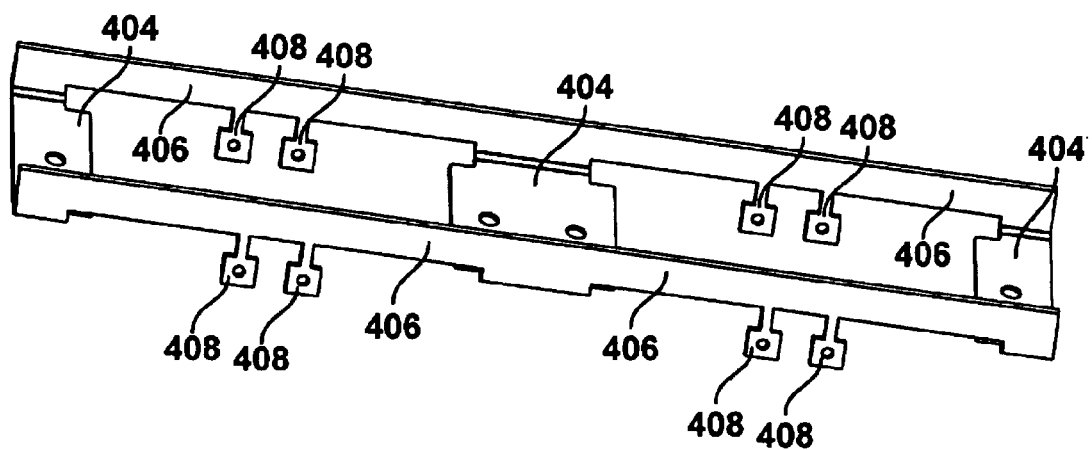
Figure 9C:
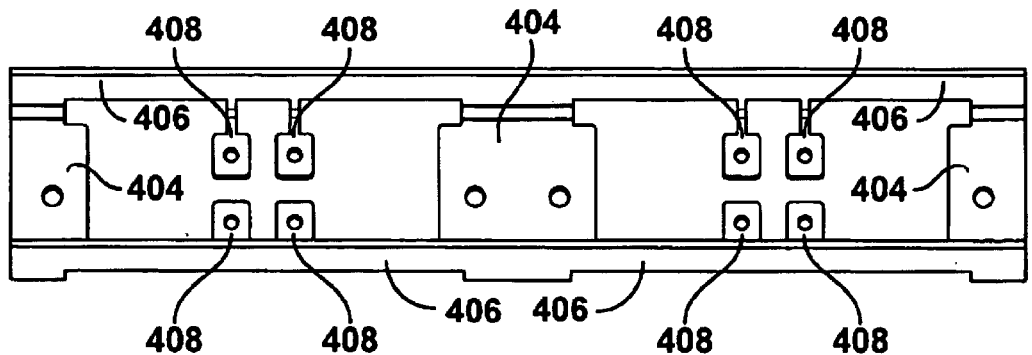
Figure 9D:
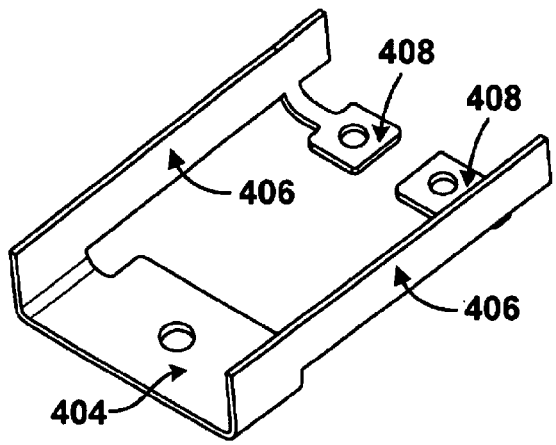

FIGS. 9a–d illustrate an alternate embodiment of a method for manufacturing the framing assembly 402. FIG. 9a shows the material 902 surrounding a series of framing assembly patterns 904 being cut from a single thin planar piece of material 906. In one embodiment, each pattern includes a base piece 404, two arms 406, and supports 408. In FIG. 9b, the arms 406 are bent perpendicular to the base piece 404. In FIG. 9c, the supports 408 are bent perpendicular to the arms 406. In FIG. 9d, an individual framing assembly 402 is separated from the other framing assemblies 402.

Figure 10A:
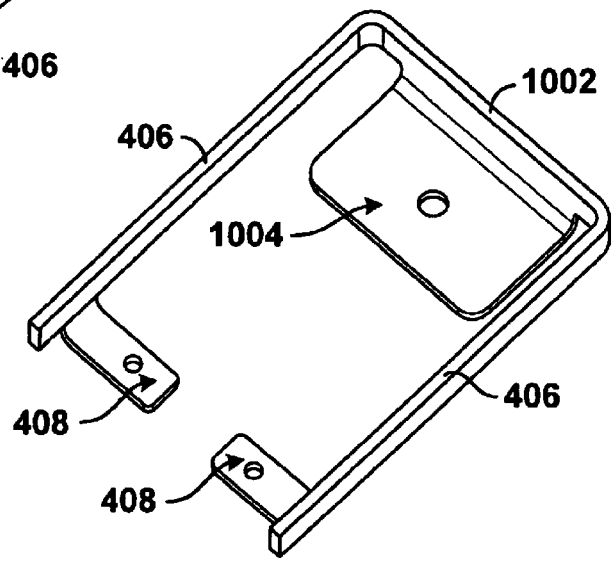
FIGS. 10a–b provides an illustration of an alternate design for the framing assembly.
Figure 10B:
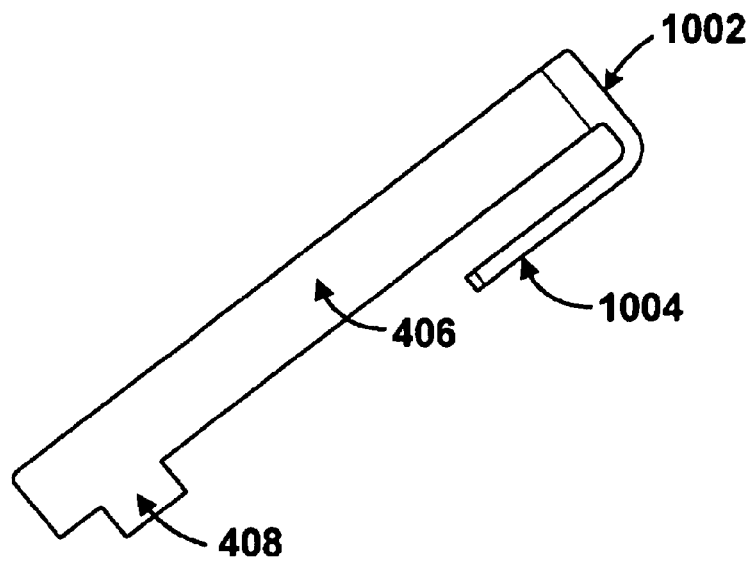

FIGS. 10a–b illustrates an alternate embodiment of the framing assembly 402. FIG. 10a shows a top view while FIG. 10b shows the side view. This embodiment of the framing assembly 402 has two arms 406 and a support on each arm 408, while the base piece 404 has a rear support 1002 and a support base 1004. In one embodiment, one arm or both arms 406 are connected to the rear support 1002, while the framing assembly 402 is coupled to the HGA 314 at the support base 1004. In one embodiment, the rear support 1002 is perpendicular to the support base 1004, with the arms 406 perpendicular to both the rear support 1002 and the support base 1004.

Figure 11A:
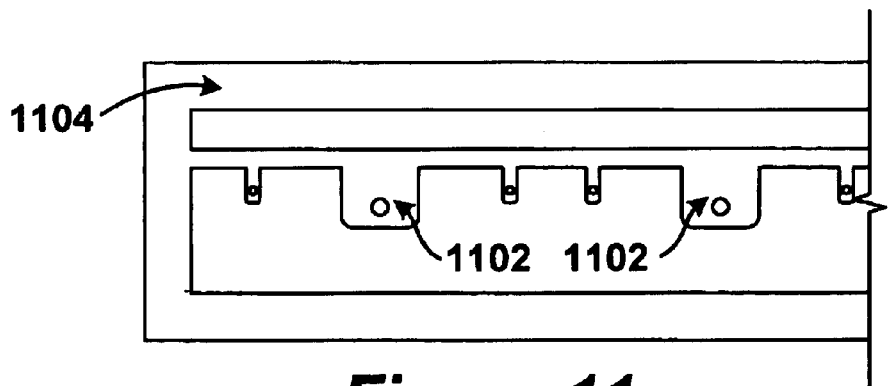
FIGS. 11a–e provides an illustration of a first method for manufacturing the alternate framing assembly.
Figure 11B:
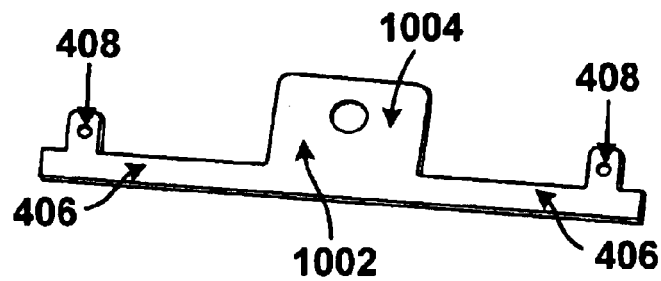
Figure 11C:
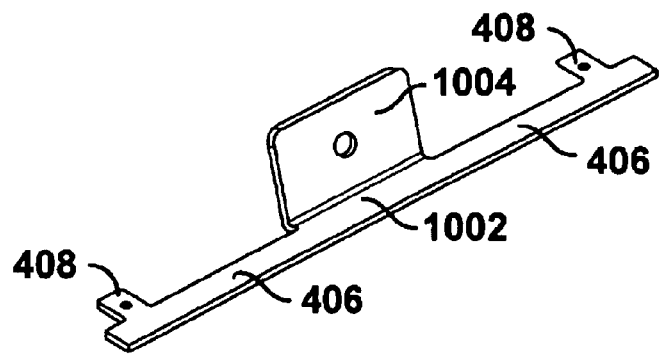
Figure 11D:
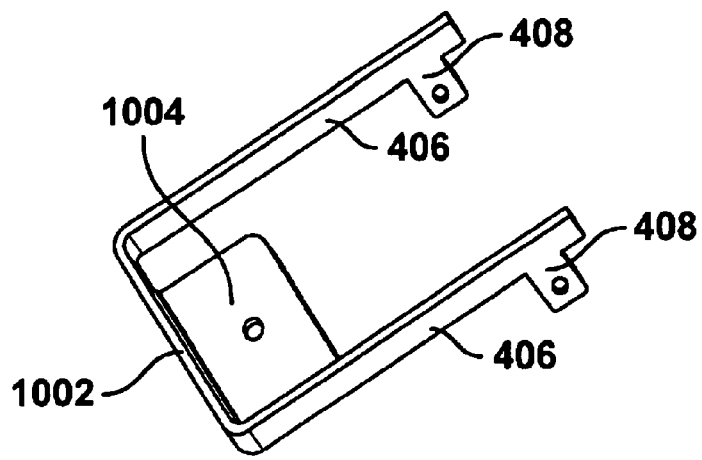
Figure 11E:
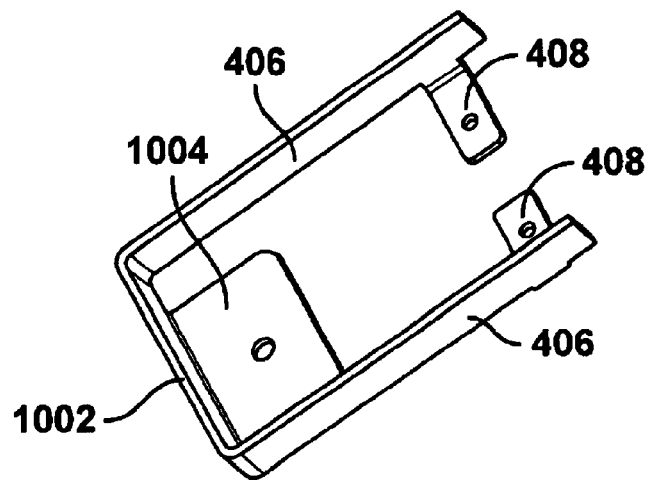

FIGS. 11a–e illustrate one embodiment of a method for manufacturing the alternate embodiment of the framing assembly 402. FIG. 11a shows a series of framing assembly patterns 1102 being cut from a single thin planar piece of material 1104. In FIG. 11b, a framing assembly 1102 pattern is separated from the other patterns and the excess material 1104. In one embodiment, a rear support 1002, a support base 1004, two arms 406, and supports 408 are all present in the pattern. In FIG. 11c, the support base 1004 is bent perpendicular to the rear support 1002. In FIG. 11d, the arms 406 are bent perpendicular to the rear support 1002. In FIG. 11e, the supports 408 are bent perpendicular to the arms 406.

Figure 12A:
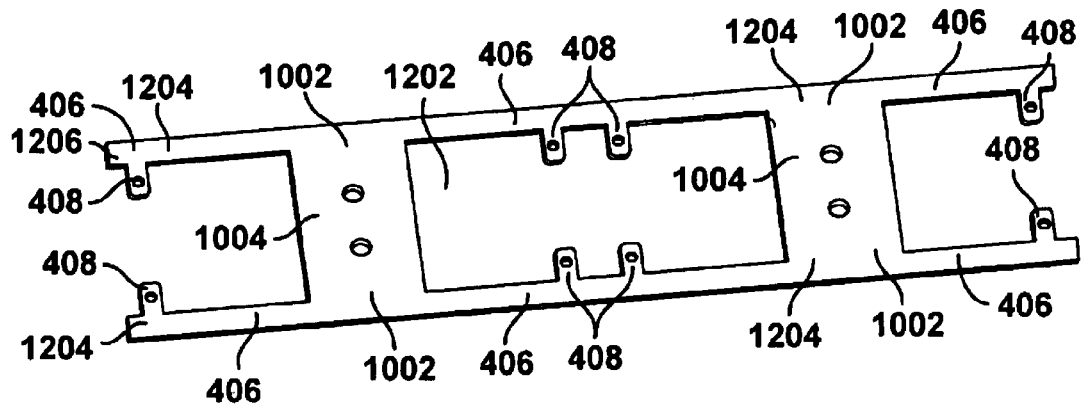
FIGS. 12a–e provides an illustration of a second method for manufacturing the alternate framing assembly.
Figure 12B:
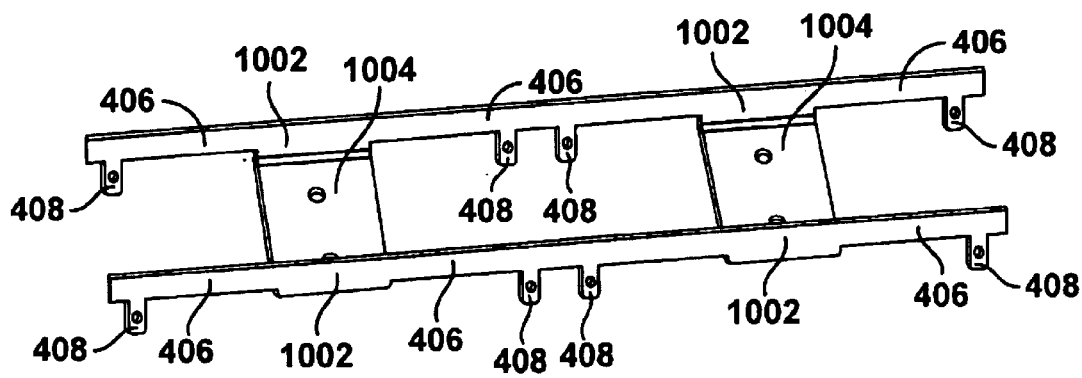
Figure 12C:
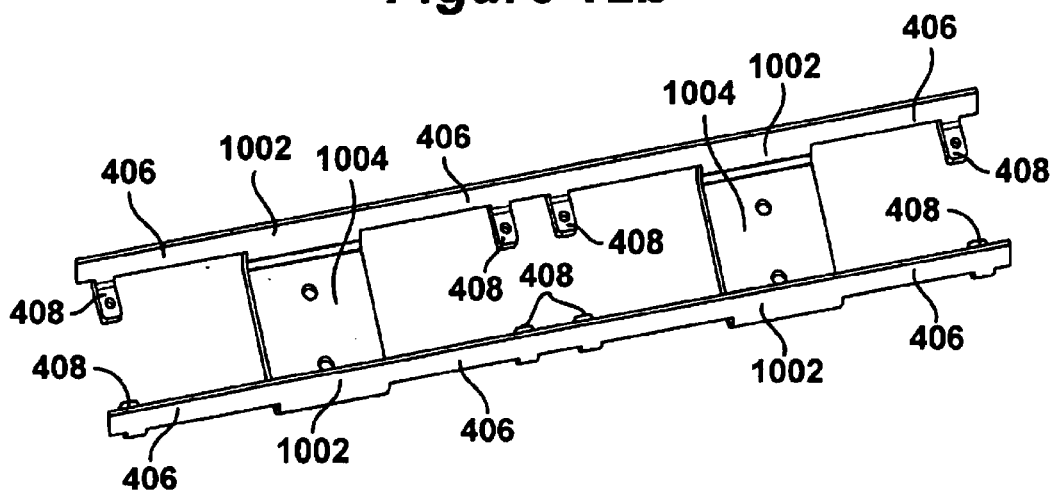
Figure 12D:
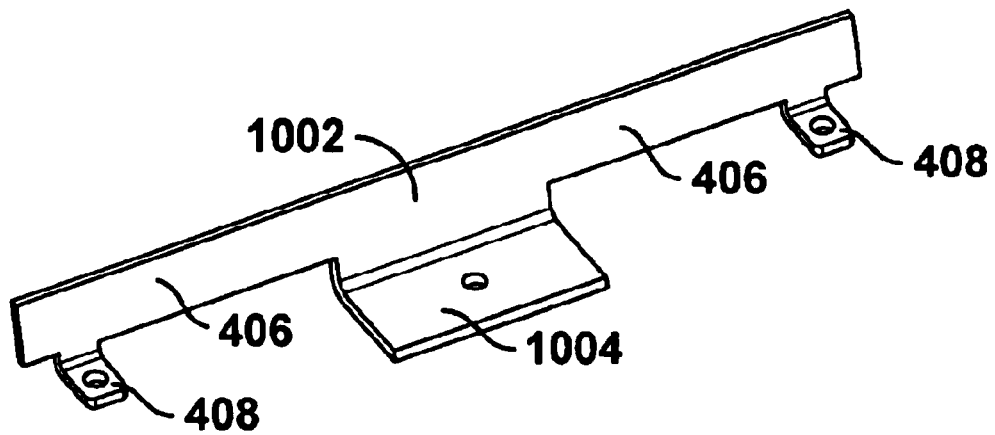
Figure 12E:
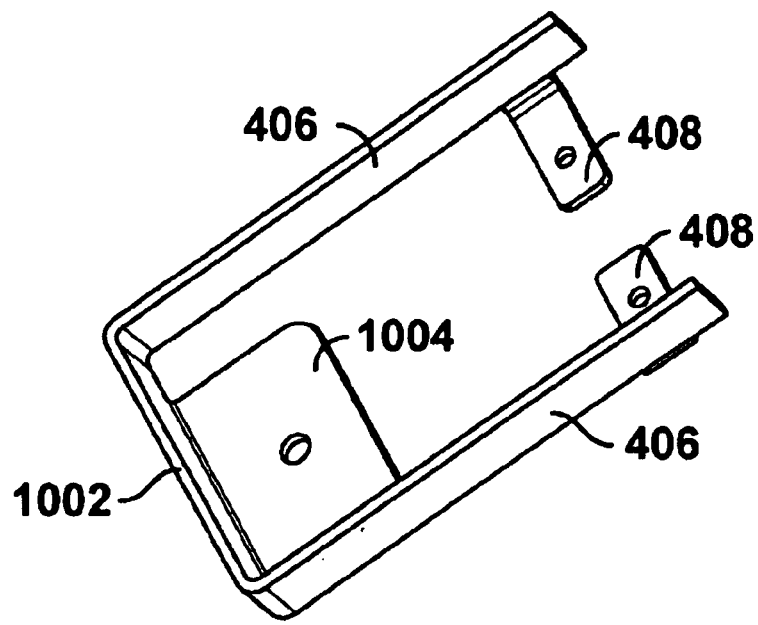

FIGS. 12a–e illustrate an alternate embodiment of a method for manufacturing the alternate embodiment of the framing assembly 402. FIG. 12a shows the material 1202 surrounding a series of framing assembly patterns 1204 being cut from a single thin planar piece of material 1206. In one embodiment, each pattern includes a rear support 1002, a support base 1004, two arms 406, and supports 408. In FIG. 12b, the arms 406 and rear support 1002 are bent perpendicular to the support base 1004. In FIG. 12c, the supports 408 are bent perpendicular to the arms 406. In FIG. 12d, an individual framing assembly pattern 1204 is separated from the other framing assembly patterns 1204. In FIG. 12e, the arms 406 are bent perpendicular to the rear support 1002.

Although several embodiments are specifically illustrated and described herein, it will be appreciated that modifications and variations of the present invention are covered by the above teachings and within the purview of the appended claims without departing from the spirit and intended scope of the invention.

What is claimed is:

1. A framing assembly of a micro-actuator, comprising:
   a base piece molded from a single thin planar piece of material to be coupled to a head gimbal assembly;
   a first arm molded from the single thin planar piece of material bent perpendicular to a first side of the base piece;
   a second arm molded from the single thin planar piece of material bent perpendicular to a second side of the base piece;
   a first support for a connection plate to be coupled to a magnetic head, the first support bent perpendicular to the first arm; and
   a second support for the connection plate bent perpendicular to the second arm.

2. The framing assembly of claim 1, wherein the framing assembly is comprised of metal.

3. The framing assembly of claim 1, wherein the base piece includes a rear support bent perpendicular to a support base, the support base to be coupled to the head gimbal assembly.

4. The framing assembly of claim 3, wherein the first arm and the second arm are coupled to the rear support, bent perpendicular to the rear support.

5. A system, comprising:
   a disk containing data;
   a head gimbal assembly with a suspension assembly;
   a magnetic read/write head to read the data from the disk;
   a printed circuit assembly to control the magnetic read/write head;
   a connection plate electrically coupling the magnetic read/write head to the printed circuit assembly; and
   a framing assembly molded from a single thin planar piece of material to connect the magnetic read/write head to the head gimbal assembly, wherein the framing assembly includes:
      a base piece to be coupled to the head gimbal assembly;
      a first arm bent perpendicular to a first side of the base; and
      a second arm bent perpendicular to a second side of the base.

6. The system of claim 5, wherein the framing assembly further includes:
   a first support for the connection plate, the first support bent perpendicular to the first arm; and
   a second support for the connection plate, the second support bent perpendicular to the second arm.

7. The system of claim 5, wherein the single thin planar piece of material is comprised of metal.

8. The system of claim 5, wherein the base piece of the framing assembly includes a rear support bent perpendicular to a support base, the support base coupled to the head gimbal assembly.

9. The system of claim 8, wherein the first arm and the second arm of the framing assembly are coupled to the rear support, bent perpendicular to the rear support.

10. The system of claim 5, further comprising a first strip of piezoelectric actuator material coupled to the first arm of the framing assembly.

11. The system of claim 5, further comprising a second strip of piezoelectric actuator material coupled to the second arm of the framing assembly.

12. A method, comprising:
   electrically coupling a magnetic read/write head to a printed circuit assembly via a connection plate; and
   coupling the magnetic read/write head to a head gimbal assembly via a framing assembly molded from a single thin planar piece of material,
   wherein the framing assembly includes a base piece to be coupled to the head gimbal assembly, a first arm bent perpendicular to a first side of the base, and a second arm bent perpendicular to a second side of the base.

13. The method of claim 12, wherein the framing assembly further includes:
   a first support for the connection plate, the first support bent perpendicular to the first arm; and
   a second support for the connection plate, the second support bent perpendicular to the second arm.

14. The method of claim 12, wherein the single thin planner piece of material is comprised of metal.

15. The method of claim 12, wherein the base piece of the framing assembly includes a rear support bent perpendicular to a support base, the support base coupled to the head gimbal assembly.

16. The method of claim 15, wherein the first arm and the second arm of the framing assembly are coupled to the rear support, bent perpendicular to the rear support.

17. The method of claim 12, further comprising controlling movement of the framing assembly with a first strip of piezoelectric actuator material coupled to the first arm of the framing assembly and a second strip of piezoelectric actuator material coupled to the second arm of the framing assembly.

* * * * *

UNITED STATES PATENT AND TRADEMARK OFFICE
CERTIFICATE OF CORRECTION

PATENT NO.        : 6,927,945 B2
APPLICATION NO. : 10/278347
DATED             : August 9, 2005
INVENTOR(S)      : Ming Gao Yao et al.

It is certified that error appears in the above-identified patent and that said Letters Patent is hereby corrected as shown below:

Column 1, Line 58 "FIGS. 3a-b describes"
      should be   --FIGS. 3a-b describe--

Column 1, Line 61 "FIGS. 4a-b provides"
      should be   --FIGS. 4a-b provide--

Column 1, Line 63 "FIGS. 5a-c provides"
      should be   --FIGS. 5a-c provide--

Column 1, Line 66 "FIGS. 6a-b provides"
      should be   --FIGS. 6a-b provide--

Column 2, Line 1   "FIGS. 7a-b provides"
      should be   --FIGS. 7a-b provide--

Column 2, Line 4   "FIGS. 8a-d provides"
      should be   --FIGS. 8a-d provide--

Column 2, Line 6   "FIGS. 9a-d provides"
      should be   --FIGS. 9a-d provide--

Column 2, Line 8   "FIGS. 10a-b provides"
      should be   --FIGS. 10a-b provide--

UNITED STATES PATENT AND TRADEMARK OFFICE
CERTIFICATE OF CORRECTION

PATENT NO. : 6,927,945 B2
APPLICATION NO. : 10/278347
DATED : August 9, 2005
INVENTOR(S) : Ming Gao Yao et al.

It is certified that error appears in the above-identified patent and that said Letters Patent is hereby corrected as shown below:

Column 2, Line 10 "FIGS. 11a-e provides"
    should be   --FIGS. 11a-e provide--

Column 2, Line 12 "FIGS. 12a-e provides"
    should be   --FIGS. 12a-e provide--

Column 3, Line 36 "helps to maintain"
    should be   --help to maintain--

Column 4, Line 9 "FIGS. 10a-b illustrates"
    should be   --FIGS. 10a-b illustrate--

Column 5, Line 2 "is comprised of metal."
    should be   --is composed of metal.--

Column 5, Line 35 "is comprised of metal."
    should be   --is composed of metal.--

Column 6, Line 24 "is comprised of metal."
    should be   --is composed of metal.--

Signed and Sealed this

Eighth Day of August, 2006

JON W. DUDAS
*Director of the United States Patent and Trademark Office*